(12) United States Patent
Zhou et al.

(10) Patent No.: US 7,175,696 B2
(45) Date of Patent: Feb. 13, 2007

(54) METHOD AND APPARATUS FOR CORROSIVE GAS PURIFICATION

(75) Inventors: Derong Zhou, Doylestown, PA (US); John P. Borzio, Robbinsville, NJ (US); Gregory M. Jursich, Clarendon Hills, IL (US); Earle R. Kebbekus, Neptune, NJ (US)

(73) Assignees: American Air Liquide, Inc., Houston, TX (US); Air Liquide America L.P., Houston, TX (US)

( * ) Notice: Subject to any disclaimer, the term of this patent is extended or adjusted under 35 U.S.C. 154(b) by 777 days.

(21) Appl. No.: 10/369,341

(22) Filed: Feb. 18, 2003

(65) Prior Publication Data

US 2003/0221947 A1 Dec. 4, 2003

Related U.S. Application Data

(60) Provisional application No. 60/358,114, filed on Feb. 19, 2002.

(51) Int. Cl.
*B01D 3/00* (2006.01)

(52) U.S. Cl. .............................. 95/117; 95/288; 203/40; 203/41; 96/134

(58) Field of Classification Search .................. 95/90, 95/117, 241, 266, 273, 288; 96/108, 134, 96/135; 203/39, 40, 41
See application file for complete search history.

(56) References Cited

U.S. PATENT DOCUMENTS

| | | | |
|---|---|---|---|
| 3,522,007 A | 7/1970 | Frevel et al. .................. 23/219 |
| 4,138,296 A | 2/1979 | Balko et al. ................. 204/128 |
| 4,230,673 A | 10/1980 | Balko et al. ................. 422/225 |
| 5,450,728 A * | 9/1995 | Vora et al. .................... 62/613 |
| 6,004,433 A | 12/1999 | Borzio et al. .................. 203/1 |
| 6,063,162 A * | 5/2000 | Orosz et al. .................. 95/182 |
| 6,110,258 A | 8/2000 | Fraenkel et al. .............. 95/117 |
| 6,203,692 B1 | 3/2001 | Sarangapani et al. ....... 205/763 |
| 6,698,237 B2 * | 3/2004 | Gaskin ........................ 62/632 |

FOREIGN PATENT DOCUMENTS

DE  29 26 591  1/1981

(Continued)

OTHER PUBLICATIONS

Hägg, "Purification of Chlorine Gas with Membranes—An Integrated Process Solution for Magnesium Production," *Separation and Purification Technology*, 21:261-278 (2001).

(Continued)

*Primary Examiner*—Frank M. Lawrence
(74) *Attorney, Agent, or Firm*—Elwood L. Haynes

(57) ABSTRACT

Herein is disclosed a method and an apparatus for preparing a highly purified gas from a crude liquid comprising the gas and one or more of a metal, particulates, water vapor, or a volatile impurity. The method comprises: (a) vaporizing the crude liquid, to yield (i) a first vapor stream comprising the gas and (ii) a first liquid stream comprising the gas; (b) removing water vapor, particulates, or both from the first vapor stream, to yield a second vapor stream comprising the gas; (c) condensing the second vapor stream, to yield a second liquid stream comprising the gas; and (d) sparging the second liquid stream with an inert gas, to yield (i) a third vapor stream comprising the gas and (ii) a third liquid stream comprising the highly purified gas. Also disclosed is a method for preparing an adsorbent to effectively remove water vapor from the gas, as well as an adsorbent so prepared.

13 Claims, 7 Drawing Sheets

FOREIGN PATENT DOCUMENTS

| | | |
|---|---|---|
| FR | 1554960 | 1/1969 |
| GB | 1157238 | 7/1969 |
| JP | 52065194 | 5/1977 |
| JP | 55020201 | 2/1980 |
| JP | 58208104 | 12/1983 |

OTHER PUBLICATIONS

Wang et al., "Field Applications of All Vapor Phase Delivery of Electronics Specialty Gases," presented at *Semicon-West* (Jul. 1999).

*Handbook of Toxic and Hazardous Chemicals and Carcinogens*, 3rd Ed., vol. I (1991).

"Alkali and Chlorine Products," *Encyclopedia of Chemical Technology*, 4th Ed., vol. I (1991).

Perrin et al., "Purification of Laboratory Chemicals," *Encyclopedia of Chemical Technology*, 4th Ed., vol. I (1988).

Ketelaar, "The Drying and Liquefaction of Chlorine and the Phase Diagram $Cl_2$-$H_2O$," *Electrochemical Technology*, 5:143-147 (Mar.-Apr. 1967).

* cited by examiner

METHOD AND APPARATUS FOR CORROSIVE GAS PURIFICATION

BACKGROUND OF THE INVENTION

The present application claims priority from copending U.S. Provisional Patent Application Ser. No. 60/358,114, filed Feb. 19, 2002.

1. Field of the Invention

The present invention relates generally to the field of gas purification. More particularly, it concerns the preparation of highly purified corrosive gases.

2. Description of Related Art

Uses for highly purified forms of a number of corrosive gases have become of interest. For example, highly purified chlorine ($Cl_2$) is useful in fabrication of semiconductors and fiber optics components. Also, highly purified forms of hydrogen bromide (HBr) and hydrogen chloride (HCl) are useful in other applications.

Commodity grade chlorine (purity of no more than about 99.0%) is most commonly prepared by aqueous electrolysis of NaCl, yielding $Cl_2$ vapor saturated with water vapor, NaOH, and NaCl. Other impurities present in commodity grade chlorine can include air, $CO_2$, chlorinated hydrocarbons, $COCl_2$, and HCl. Such impurities can be present at 1.0% or more.

In semiconductor fabrication processes using chlorine as an etching gas, the presence of as much as 5–10 ppm by volume of water vapor can degrade the performance of submicron integrated circuits. In fiber optics component fabrication processes using chlorine to remove hydrogenous impurities from molten silica, impurities present in the chlorine can degrade the optical transmission properties of a fiber formed from the molten silica.

A number of techniques for attaining higher purity levels have been reported, including distillation (Rosenblads, GB Pat. No. 1,157,238), compression liquefaction/vaporization (Payer et al., DE Pat. No. 2,926,591), organic solvent extraction (Balko et al., U.S. Pat. No. 4,230,673), adsorption using zeolites, silica gel, and chlorinated carbon (Frevel et al., U.S. Pat. No. 3,522,007; Takaishi, JP Pat. No. 52065194; Ueno et al., JP Pat. No. 58208104; Ukihashi, JP Pat. No. 55020201; and Fraenkel et al., U.S. Pat. No. 6,110,258), membrane separation (Hagg, *Sep. Purif. Technol.* 21:261–278 (January 2001), and electrochemical reduction/oxidation (Sarangapani et al., U.S. Pat. No. 6,203,692). Each of these techniques has shortcomings that make it difficult to quickly, efficiently, or easily prepare a highly purified gas from a process comprising the technique.

For example, distillation requires a large investment in time, equipment, and utilities to prepare a highly purified gas. Compression liquefaction/vaporization generally involves mechanical compression, which will tend to lead to high levels of metal and particulates contamination and corrosion of mechanical compression pumps by chlorine or other corrosive gases. Organic solvent extraction leads to solvent contamination, which must be removed downstream; also, many organic solvents, such as $CCl_4$, are undesirable for use on environmental or health grounds. Adsorbents can remove specific impurities to sub-ppm levels, but not all impurities are amenable to adsorption. Membrane separation by itself is not practical for removing trace impurities. Electrochemical capture and release of chlorine is not practical for purifying high-concentration chlorine and will tend to lead to contamination by electrolysis products.

It has been shown that content of metallic impurities can be reduced by controlled vaporization of liquefied crude chlorine (Borzio et al., U.S. Pat. No. 6,004,433). However, controlled vaporization can tend to make light weight, volatile impurities more concentrated in the vapor. To remove volatile impurities from the vapor, solid adsorbers have been considered, such as so-called "acid resistant" molecular sieves, $MgClO_4$, silica gels, and $P_2O_5$. However, these adsorbers have a number of shortcomings, e.g., $MgClO_4$ can become explosive when in contact with organic impurities; silica gel has limited moisture removal efficiency; and $P_2O_5$ presents industrial safety issues upon reacting with water.

Therefore, there is no known purification process that provides high purity corrosive gases with a short lead time, high efficiency, and low pollution.

SUMMARY OF THE INVENTION

In one embodiment, the present invention relates to a method for preparing a highly purified gas from a crude liquid comprising the gas and one or more of a metal, particulates, water vapor, or a volatile impurity, comprising:

vaporizing the crude liquid, to yield (i) a first vapor stream comprising the gas and (ii) a first liquid stream comprising the gas;

removing water vapor, particulates, or both from the first vapor stream, to yield a second vapor stream comprising the gas;

condensing the second vapor stream, to yield a second liquid stream comprising the gas; and sparging the second liquid stream with an inert gas, to yield (i) a third vapor stream comprising the gas and (ii) a third liquid stream comprising the highly purified gas.

In another embodiment, the present invention relates to a highly purified gas, prepared from a crude liquid comprising the gas and one or more of a metal, particulates, water vapor, or a volatile impurity, by a method comprising:

vaporizing the crude liquid, to yield (i) a first vapor stream comprising the gas and (ii) a first liquid stream comprising the gas;

removing water vapor, particulates, or both from the first vapor stream, to yield a second vapor stream comprising the gas;

condensing the second vapor stream, to yield a second liquid stream comprising the gas; and sparging the second liquid stream with an inert gas, to yield (i) a third vapor stream comprising the gas and (ii) a third liquid stream comprising the highly purified gas.

In a further embodiment, the present invention relates to a gas purification system, comprising:

a feed conduit for passing a first liquid stream to at least one inlet of a vaporizing zone;

the vaporizing zone, wherein the vaporizing zone comprises at least one inlet and at least one outlet;

a first conduit for passing a first vapor stream from at least one outlet of the vaporizing zone to at least one inlet of a treating zone;

the treating zone, wherein the treating zone comprises at least one inlet and at least one outlet;

a second conduit for passing a second vapor stream from at least one outlet of the treating zone to at least one inlet of a first condensing zone;

the first condensing zone, wherein the first condensing zone comprises at least one inlet and at least one outlet;

a third conduit for passing a second liquid stream from at least one outlet of the condensing zone to at least one inlet of a sparging zone; and the sparging zone, wherein the sparging zone comprises at least one inlet, at least one vapor outlet, and at least one liquid outlet.

Benefits of the system and method for gas purification can include greater operation efficiency, safer handling, and lower release of emissions to the environment. One or more of these benefits, other benefits, or both may be found in one or more embodiments of the system or method.

In one embodiment, the present invention relates to a method of treating an adsorbent, comprising:

first heating the adsorbent at a first temperature under dry nitrogen; and second heating the adsorbent at a second temperature, wherein the second temperature is less than the first temperature and greater than 100° C., under a gas comprising $Cl_2$, $Br_2$, $F_2$, HCl, HF, or HBr.

In a further embodiment, the present invention relates to an adsorbent, prepared by the method of treating an adsorbent stated above.

Benefits of the method of treating an adsorbent and the adsorbent prepared therefrom can include superior removal of water vapor in a system or method for gas purification. One or more of these benefits, other benefits, or both may be found in one or more embodiments of the method and the adsorbent.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
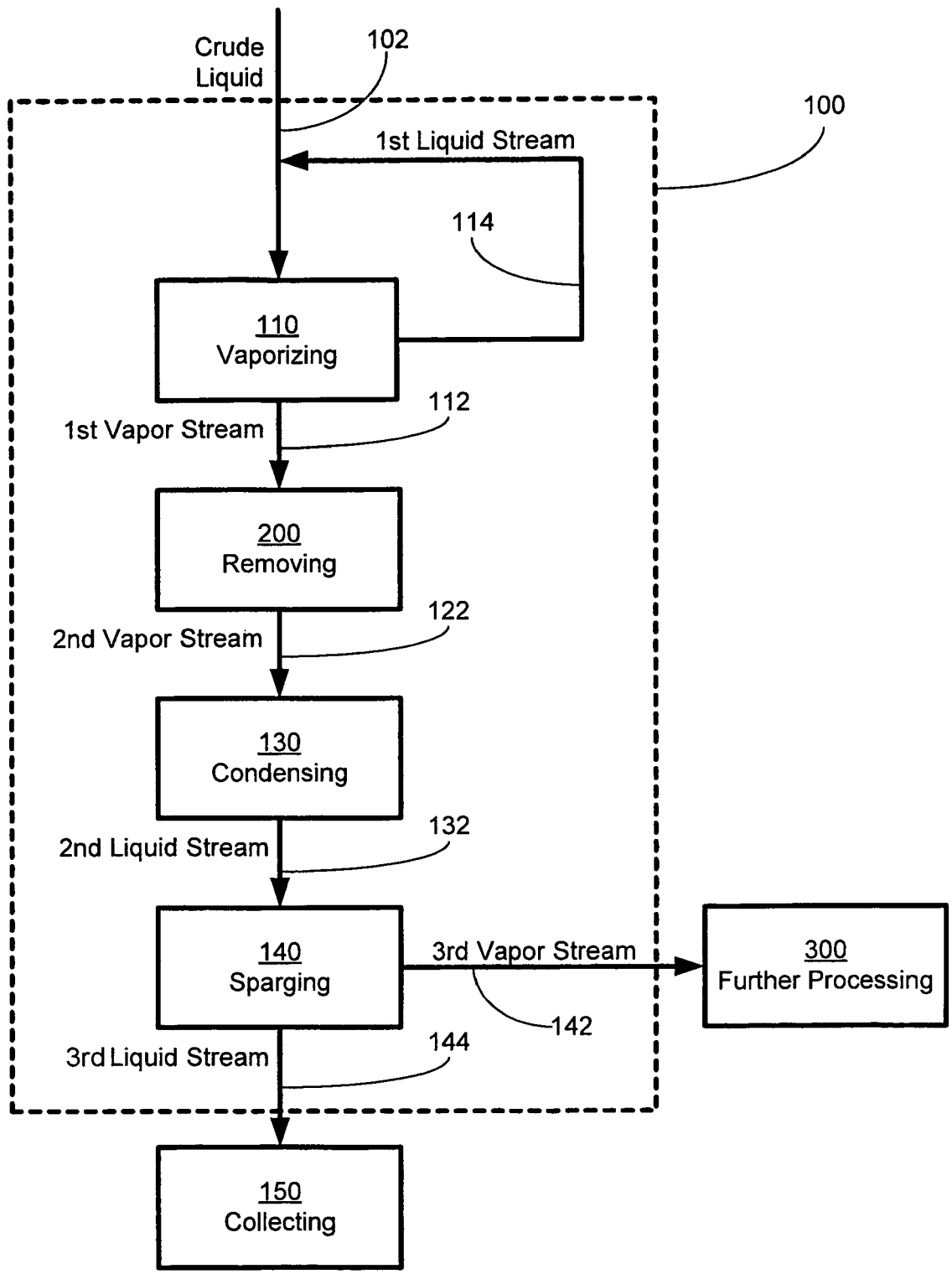
FIG. 1 presents a flow chart of one embodiment of the method for preparing a highly purified gas from a crude liquid comprising the gas and one or more of a metal, particulates, water vapor, or a volatile impurity.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The term "gas," as used herein, refers to a compound that is in the vapor phase at room temperature and 1 atm pressure. As will be apparent to the skilled artisan, such a compound could be in the liquid phase or the solid phase, depending on the temperature and pressure. Even if the compound is in a liquid or solid form, it will herein be termed a "gas." The term "vapor," as used herein, refers to a compound or mixture of compounds that is or are in the vapor phase at the particular temperature and particular pressure stated in the context in which the term "vapor" is used. In other words, a gas can, but need not, be a vapor; also, a vapor under a particular set of conditions need not be a gas or comprise a gas.

In one embodiment, the present invention relates to a method for preparing a highly purified gas from a crude liquid comprising the gas and one or more of a metal, particulates, water vapor, or a volatile impurity, comprising:

vaporizing the crude liquid, to yield (i) a first vapor stream comprising the gas and (ii) a first liquid stream comprising the gas;

removing water vapor, particulates, or both from the first vapor stream, to yield a second vapor stream comprising the gas;

condensing the second vapor stream, to yield a second liquid stream comprising the gas; and sparging the second liquid stream with an inert gas, to yield (i) a third vapor stream comprising the gas and (ii) a third liquid stream comprising the highly purified gas.

A "highly purified" gas or "high purification," as used herein, refer to a state wherein one or more of metal, particulates, water vapor, or one or more volatile impurities have been removed from the gas. "Removed" means that the concentration of the metal, particulates, water vapor, or one or more volatile impurities is reduced, but not necessarily to zero. The concentration to which the metal, particulates, water vapor, or one or more volatile impurities is reduced will vary depending on the desires of the end user of the purified gas. In one embodiment, the concentration of metals is reduced to about 10 ppb or less. In one embodiment, the concentration of particulates is reduced to about 10 particles/cc or less. In one embodiment, the concentration of water vapor is reduced to about 10 ppm or less. In one embodiment, the concentration of volatile compounds is reduced to about 10 ppm or less.

Depending on the gas and the intended end use of the highly purified gas, one or more of the metal, particulates, water vapor, or one or more volatile impurities can be present in the highly purified gas with the gas retaining its property of being highly purified. In one embodiment, nitrogen ($N_2$) is present at up to about 1% of the highly purified gas. (All percentages expressed herein are by weight relative to the total weight of the composition, unless otherwise noted. All parts-per-million (ppm) and parts-per-billion (ppb) values expressed herein are by volume relative to the total volume of the composition, unless otherwise noted. In the context of metals, ppb is by weight relative to the total weight of the composition).

The method can be used to purify any gas. In one embodiment, the gas comprises $Cl_2$, $Br_2$, $F_2$, HCl, HF, or HBr. In a further embodiment, the gas comprises $Cl_2$.

A flow chart of one embodiment of the method is presented in FIG. 1. Specifically, the method 100 can comprise the following steps.

In the vaporizing step 110, the crude liquid is vaporized. A "crude liquid" is a composition comprising the gas to be purified, as well as any impurities that may be present, wherein the composition is held at a temperature, pressure, and other parameters wherein it is substantially liquid. By "vaporized" is meant that the gas passes from the liquid phase within the crude liquid to the vapor phase within the headspace of a tank or a vessel wherein the crude liquid is present (herein, "crude tank"). The crude liquid 102 is provided to the crude tank by any appropriate technique known to one of ordinary skill in the art. "Headspace" has its standard meaning of the space within a vessel above the level of any liquid present in the vessel. Vaporization can be performed by applying one or more of heat, reduced pressure, or other appropriate techniques known to one of ordinary skill in the art to the crude liquid. The rate at which one or more of heat, reduced pressure, or the like will vaporize the gas will depend on the amount of heat, the reduced pressure, or the like, as well as depend on the size and geometry of the crude tank, associated transfer lines, valves, or two or more thereof; the temperature of the condensing step 130 (described below); the overall geometry of the system; and other parameters that will be apparent to the skilled artisan.

In one embodiment, the vaporization rate can be kept low enough such that aerosols (i.e., small liquid drops) substantially do not form and are not borne by the vapor phase. In this embodiment, substantially all the metal, if any, present in the crude liquid can remain in the crude liquid. By "substantially all" in this context is meant that the concentration of metals present in the vapor phase is less than about 10 ppb. Metals will tend to be present in the vapor phase as particulates, including particulate nuclei of aerosol droplets.

If water vapor is present in the crude liquid, typically at least a portion of the water vapor will enter the vapor phase during the vaporizing step. If one or more volatile impurities are present in the crude liquid, typically at least a portion of at least one of the volatile impurities may also enter the vapor phase during the vaporizing step. As used herein, a "volatile impurity" is any compound other than the gas for which high purification is desired or water, wherein at least a portion of an aliquot of the compound is in the vapor phase at room temperature and ambient pressure. Exemplary volatile impurities can include, but are not limited to, $O_2$, $N_2$, $CO_2$, other components of air, CO, and HCl, among others. A compound considered a volatile impurity in one embodiment can be the gas for which high purification is desired in another embodiment.

The vaporizing step 110 yields a first vapor stream 112 comprising the gas. The first vapor stream can also comprise water vapor, one or more volatile impurities, or both. Also, the first vapor stream can comprise particulates. The remaining crude liquid can be referred to as a first liquid stream 114 comprising the gas in the liquid phase. If a metal is present in the crude liquid, much of the metal can remain in the first liquid stream. If water vapor, one or more volatile impurities, or both are present in the crude liquid, a portion of the water vapor, one or more volatile impurities, or both can remain in the first liquid stream.

The method flow chart 100 shows the first liquid stream 114 being recycled to the crude liquid 102. This recycling is notional, as the vaporizing step 110 can be continuous, i.e., the first liquid stream 114 produced by the vaporizing step 110 during a first time increment will generally remain in the crude tank during a second time increment of the vaporizing step 110 and can be considered a crude liquid 102 for the second time increment.

The first vapor stream 112 resulting from the vaporizing step 110 can then be subjected to a removing step 200. In the removing step 200, water vapor, particulates, or both can be removed from the first vapor stream, to yield a second vapor stream comprising the gas.

Figure 2A:
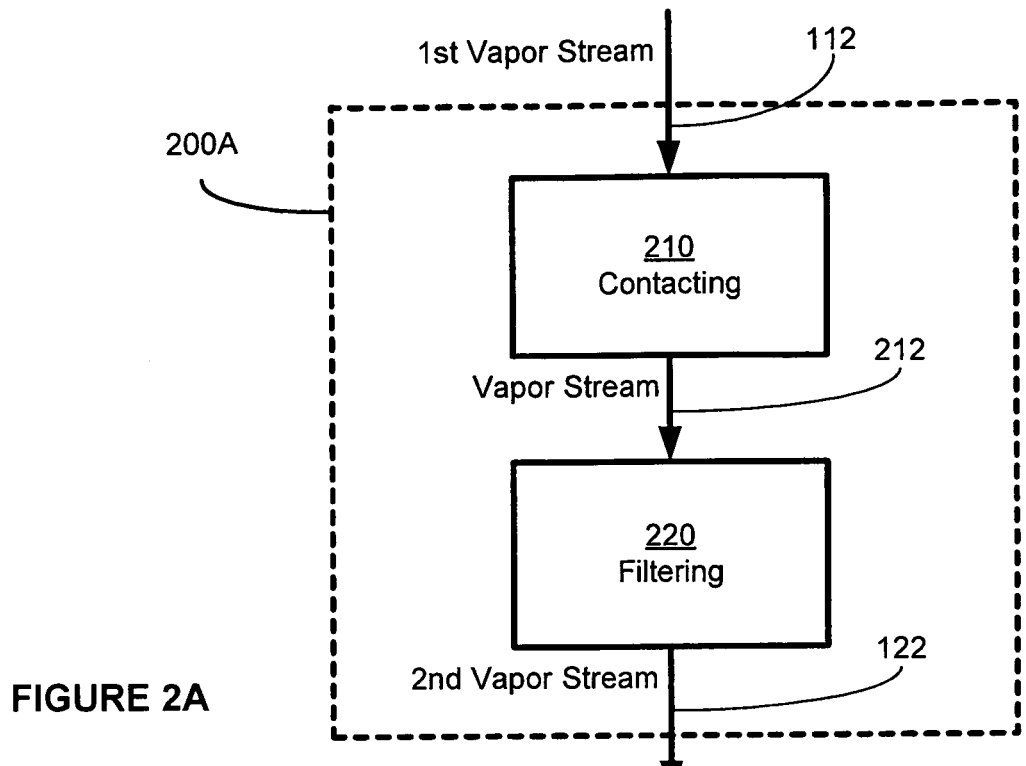
FIGS. 2A and 2B present flow charts of two different embodiments of the removing step of the embodiment of the method shown in FIG. 1.
Figure 2B:
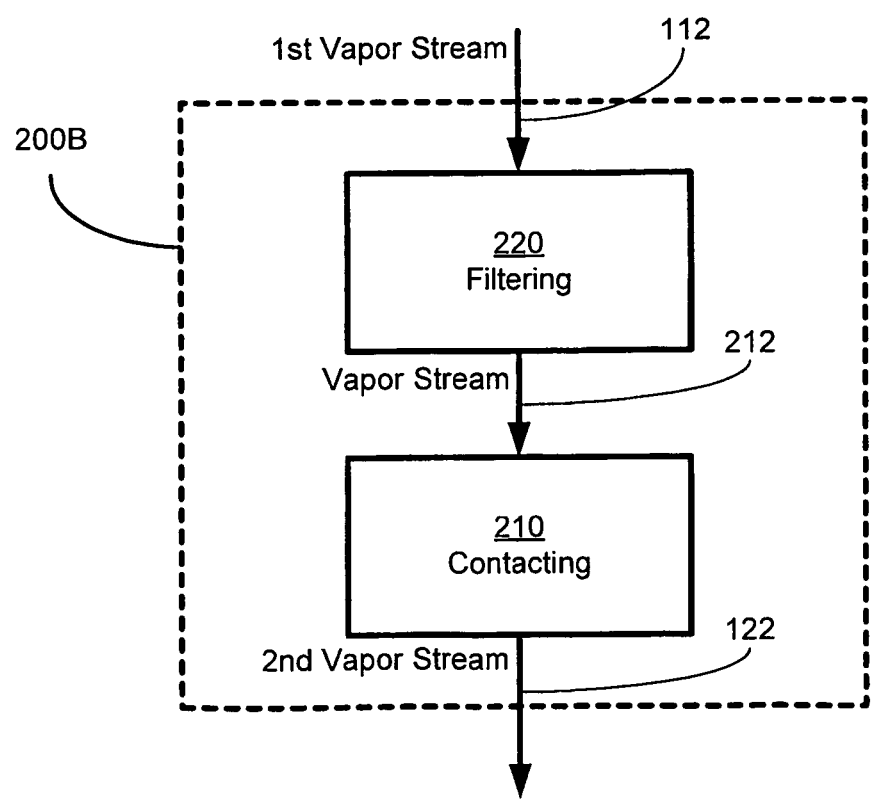

Turning to FIGS. 2A and 2B, two embodiments of the removing step 200 are illustrated. The removing step 200 may comprise a contacting substep 210, wherein a first vapor stream is contacted with an adsorbent, to remove water vapor from the first vapor stream, and a filtering substep 220, wherein the first vapor stream is filtered, to remove particulates. The vapor stream fed from one substep to the other substep is labeled vapor stream 212 in FIGS. 2A and 2B.

In the contacting substep 210, the first vapor stream is contacted with an adsorbent, to remove water vapor from the first vapor stream. Adsorbents capable of removing water vapor from a vapor stream are known in the art. In one embodiment, the adsorbent is a silica-alumina adsorbent. Exemplary commercially available silica-alumina adsorbents include the model names AW-300 and AW-500 (UOP LLC, Des Plaines, Ill.), among others. In another embodiment, the adsorbent is an alumina adsorbent. In a further embodiment, the adsorbent is an activated carbon adsorbent.

In one embodiment, when the gas to be purified is $Cl_2$, $Br_2$, HCl, or HBr, the adsorbent can be a silica-alumina adsorbent. In another embodiment, when the gas to be purified is $F_2$ or HF, the adsorbent can be an alumina adsorbent or an activated carbon adsorbent.

In one embodiment, the adsorbent is prepared by a process 400 described below. A adsorbent prepared according to the process can remove water vapor from the first vapor stream 112 down to less than about 5 ppm. In one embodiment, the adsorbent prepared according to the process can remove water vapor from the first vapor stream 112 down to less than about 1 ppm.

The contacting step 210 can be performed at any appropriate temperature, pressure, and other parameters routinely derivable by the skilled artisan in view of the present specification.

In one embodiment, if the first vapor stream 112 has a water vapor content less than or equal to the water vapor content desired by the end user for the highly purified gas, then the contacting substep 210 can be dispensed with. Alternatively, in this embodiment, the contacting substep 210 can be performed with little if any detriment to the quality or ease of preparing the highly purified gas, the maintenance of the adsorbent, and other parameters that will be apparent to the skilled artisan having the benefit of the present disclosure.

In the filtering substep 220, the first vapor stream is filtered, to remove particulates. Filtering can be performed by a filter comprising one or more materials known to be useful in filter manufacturing. Exemplary materials include, but are not limited to, tetrafluoroethylene (PTFE; commercially available as Teflon®, DuPont, Wilmington, Del.), ceramics, and sintered metals, among others. In one embodiment, the filter comprises PTFE.

The pore size of the filter can be any size less than the diameter of at least a portion of the particles of the particulates. In one embodiment, the pore size of the filter is about 0.5 microns (in other words, particles with a diameter greater than about 0.5 microns would be expected to be removed by the filtering substep 220). In another embodiment, the pore size of the filter is about 0.03 microns.

The filtering step 220 can be performed at any appropriate temperature, pressure, and other parameters routinely derivable by the skilled artisan in view of the present specification.

In one embodiment, if the first vapor stream 112 has a particulates concentration below the level desired by the end user for the highly purified gas, then the filtering substep 220 can be dispensed with. Alternatively, in this embodiment, the filtering substep 220 can be performed with little if any detriment to the quality or ease of preparing the highly purified gas, the maintenance of the filter, and other parameters that will be apparent to the skilled artisan.

As FIGS. 2A and 2B show, the order in which the contacting substep 210 and the filtering substep 220 may be interchanged.

The removing step 200 yields a second vapor stream 122. The second vapor stream 122 comprises the gas. The second vapor stream 122 can also comprise one or more volatile impurities, if volatile impurities were present in the crude liquid 102 and entered the vapor phase during the vaporizing step 110. Also, the second vapor stream 122 can comprise water vapor not removed by the contacting substep 210. Further, the second vapor stream 122 can comprise particulates not removed by the filtering substep 220. In one embodiment, the second vapor stream 122 comprises less than about 5 ppm water vapor. In another embodiment, the second vapor stream 122 comprises less than about 1 ppm water vapor. In one embodiment, the second vapor stream 122 comprises an amount of particulates below the detection limit of the particulates. Typically, the second vapor stream 122 comprises the gas and one or more volatile impurities.

The second vapor stream 122 may be subjected to a condensing step 130.

The condensing step 130 comprises condensing the second vapor stream 122. In the condensing step 130, the second vapor stream 122 is condensed to the liquid phase. The condensing step 130 can be performed by reducing the temperature of the second vapor stream 122, increasing the pressure of the second vapor stream 122, or a combination of reducing the temperature and increasing the pressure, among other techniques known to the skilled artisan. In one embodiment, the temperature of the second vapor stream 122 is reduced to a temperature between about 20° F. and about 40° F. above the freezing point of the gas.

The condensing step 130 yields a second liquid stream 132 comprising the gas. The second liquid stream 132 can also comprise one or more volatile impurities. Also, the second liquid stream 132 can comprise water vapor not removed by the contacting substep 210. Further, the second liquid stream 132 can comprise particulates not removed by the filtering substep 220. Typically, the second liquid stream 132 comprises the gas and one or more volatile impurities.

The second liquid stream 132 can be subjected to a sparging step 140.

In the sparging step 140, the second liquid stream 132 is sparged with an inert gas to remove at least a portion of one or more volatile impurities from the second liquid stream 132. An "inert gas," as used herein, is a compound which is in the vapor phase at 1 atm pressure and ambient temperature, and which is substantially not reactive with the gas for which high purification is desired. In one embodiment, the inert gas can be a noble gas other than radon (i.e., helium, neon, argon, krypton, xenon) or a mixture of such noble gases other than radon. The term "noble gas" refers to the compounds of Group VIII of the periodic table. In a further embodiment, the inert gas can be helium. In one embodiment, the inert gas can be nitrogen. Nitrogen can be suitable for use as the inert gas if the desired high purification is compatible with a level of nitrogen greater than zero.

In one embodiment, the sparging step 140 can make use of nitrogen as the inert gas for a beginning portion of the step and helium as the inert gas for an ending portion of the step.

The sparging step 140 can be performed at any appropriate temperature, pressure, and other parameters routinely derivable by the skilled artisan in view of the present specification. In one embodiment, during the sparging step 140, the temperature of the second liquid stream 132 is held at a temperature between about 20° F. and about 40° F. above the freezing point of the gas. In another embodiment, during the sparging step 140, the temperature of the second liquid stream 132 is held at a temperature between about 70° F. and about 150° F.

In one embodiment, the pressure at which the inert gas is applied in the sparging step 140 can be from about 300 psig to about 700 psig.

In the sparging step 140, the inert gas is forced through the second liquid stream 132. If one or more volatile impurities are present in the second liquid stream 132, they may be carried out of the second liquid stream 132 by the inert gas. In addition, a portion of the gas may be carried out of the second liquid stream 132 by the inert gas. The sparging step 140 may be continued until the content of one or more volatile impurities is reduced to a desired level. In one embodiment, the content of one or more volatile impurities is reduced to less than about 5 ppm.

If the second liquid stream 132 has a volatile compounds content less than or equal to the volatile compounds content desired by the end user for the highly purified gas, then the sparging step 140 can be dispensed with. Alternatively, in this embodiment, the sparging step 140 can be performed with little if any detriment to the quality or ease of preparing the highly purified gas, the maintenance of the sparging apparatus, and other parameters that will be apparent to the skilled artisan having the benefit of the present disclosure.

The sparging step 140 yields a third vapor stream 142 comprising the inert gas and one or more volatile impurities, if any were present in the second liquid stream 132. In one embodiment, the third vapor stream 142 can comprise at least a portion of the gas. The remaining liquid, left behind after sparging of the second liquid stream 132, can be referred to as a third liquid stream 144. The third liquid stream 144 comprises the highly purified gas.

The third liquid stream 144 can be drawn off and collected in a collecting step 150. In one embodiment, the third vapor stream 142 can be directly disposed from the system. In another embodiment, the third vapor stream 142 can be further processed by steps 300.

Figure 3:
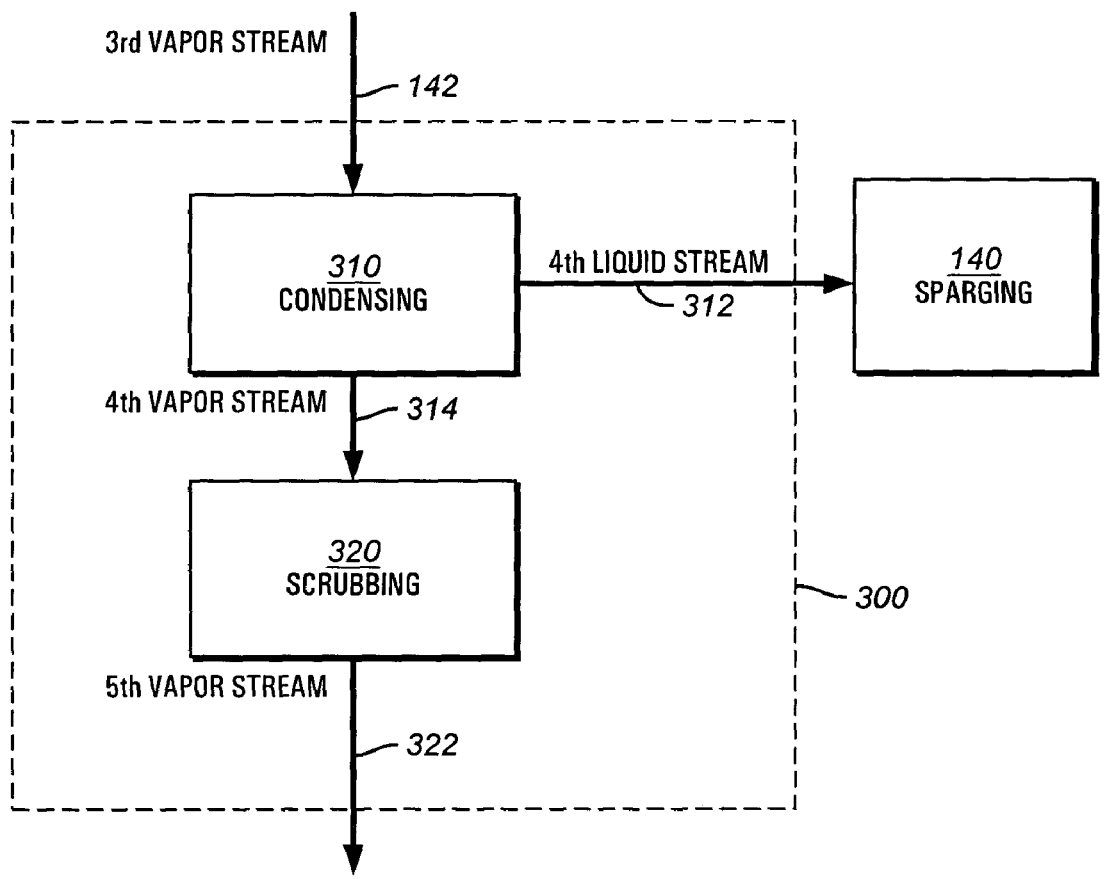
FIG. 3 presents a flow chart of one embodiment of an additional scrubbing step and an additional condensing step of the embodiment of the method shown in FIG. 1.

In one embodiment, the further processing steps 300 can be as represented by FIG. 3.

In one embodiment of the further processing steps 300, the third vapor stream 142 can be subjected to a condensing step 310 to condense the gas while retaining the inert gas and the one or more volatile compounds in the vapor phase. The condensing step 310 can be performed at the same temperature, pressure, and other parameters as the previous condensing step 130; however, other temperatures, pressures, and other parameters can be used. In one embodiment, the temperature at which the condensing step 310 is performed is about 20° F. greater than the freezing point of the gas. In one embodiment, the pressure at which the condensing step 310 is performed is about that at which the sparging step 140 is performed.

In the condensing step 310, the gas can be condensed and much, if not all, of both the inert gas and one or more volatile impurities, if present, can remain uncondensed, i.e., remain in the vapor phase. The condensing step 310 thus can yield (i) a fourth vapor stream 314 comprising the inert gas and (ii) a fourth liquid stream 312 comprising the gas.

The fourth vapor stream 314 comprises the inert gas. The fourth vapor stream 314 can also comprise at least a portion of one or more volatile impurities, if any, present in the third vapor stream 142. Also, the fourth vapor stream 314 can comprise the gas. Generally, only a small amount of the gas will be present in the fourth vapor stream 314.

The fourth vapor stream 314 can be directly eliminated from the system. Alternatively, in one embodiment, the fourth vapor stream 314 is subjected to a scrubbing step 320. In the scrubbing step 320, a major portion of the gas present in the fourth vapor stream 314 may be selectively removed. In one embodiment, the selective removal involves contacting the fourth vapor stream 314 with a liquid (a) in which the gas is more highly soluble than is the inert gas, the one or more volatile impurities, if any, or both, (b) with which the gas is more highly reactive than is the inert gas, the one or more volatile impurities, if any, or both, or (c) both. Alternative techniques for selective removal of the major portion of the gas from the fourth vapor stream 314 will be apparent to one of ordinary skill in the art having the benefit of the present disclosure. The scrubbing step 320 yields a fifth vapor stream 322. The fifth vapor stream 322 comprises the inert gas. The fifth vapor stream 322 can also comprise one or more volatile impurities, if any. In one embodiment, the fifth vapor stream 322 comprises less than about 10 ppm the gas. The fifth vapor stream 322 can then be eliminated from the system and disposed of by any known, appropriate, or required technique known to one of ordinary skill in the art.

The fourth liquid stream 312 comprises the gas. The fourth liquid stream 312 also can comprise a portion of the inert gas. In one embodiment, the fourth liquid stream 312 comprises less than about 10 ppm inert gas. The fourth liquid stream 312 also can comprise a portion of one or more of the volatile impurities, if any, present in the third vapor stream 142. In one embodiment, the fourth liquid stream 312 comprises less than about 5 ppm volatile impurities. In another embodiment, the fourth liquid stream 312 comprises less than about 1 ppm volatile impurities.

The fourth liquid stream 312 can then be recycled to the sparging step 140, where it can be mixed with the second liquid stream 132 or otherwise subjected to sparging.

As stated above, the third liquid stream 144 comprises the highly purified gas. As stated, it can be drawn off in a collecting step 150 and either used directly or stored for future processing or use.

In another embodiment, the present invention relates to a highly purified gas, prepared from a crude liquid comprising the gas and one or more of a metal, particulates, water vapor, or a volatile impurity, by the method described above. In one embodiment, the highly purified gas comprises $Cl_2$, $Br_2$, $F_2$, HCl, HF, or HBr. In another embodiment, the highly purified gas comprises $Cl_2$.

In one embodiment, the highly purified gas comprises less than about 1 ppb metal; less than about 1 ppm water vapor; less than about 1 ppm volatile impurities; and less than about 1 ppm inert gas. Other specifications of the highly purified gas are possible, and will vary depending on the gas, its intended use, and other parameters apparent to the skilled artisan.

In another embodiment, the present invention relates to a gas purification system, comprising:

a feed conduit for passing a first liquid stream to at least one inlet of a vaporizing zone;

the vaporizing zone, wherein the vaporizing zone comprises at least one inlet and at least one outlet;

a first conduit for passing a first vapor stream from at least one outlet of the vaporizing zone to at least one inlet of a treating zone;

the treating zone, wherein the treating zone comprises at least one inlet and at least one outlet;

a second conduit for passing a second vapor stream from at least one outlet of the treating zone to at least one inlet of a first condensing zone;

the first condensing zone, wherein the first condensing zone comprises at least one inlet and at least one outlet;

a third conduit for passing a second liquid stream from at least one outlet of the first condensing zone to at least one inlet of a sparging zone; and the sparging zone, wherein the sparging zone comprises at least one inlet, at least one vapor outlet, and at least one liquid outlet.

The gas purification system can be run on either a continuous basis or a batch basis.

Figure 6:
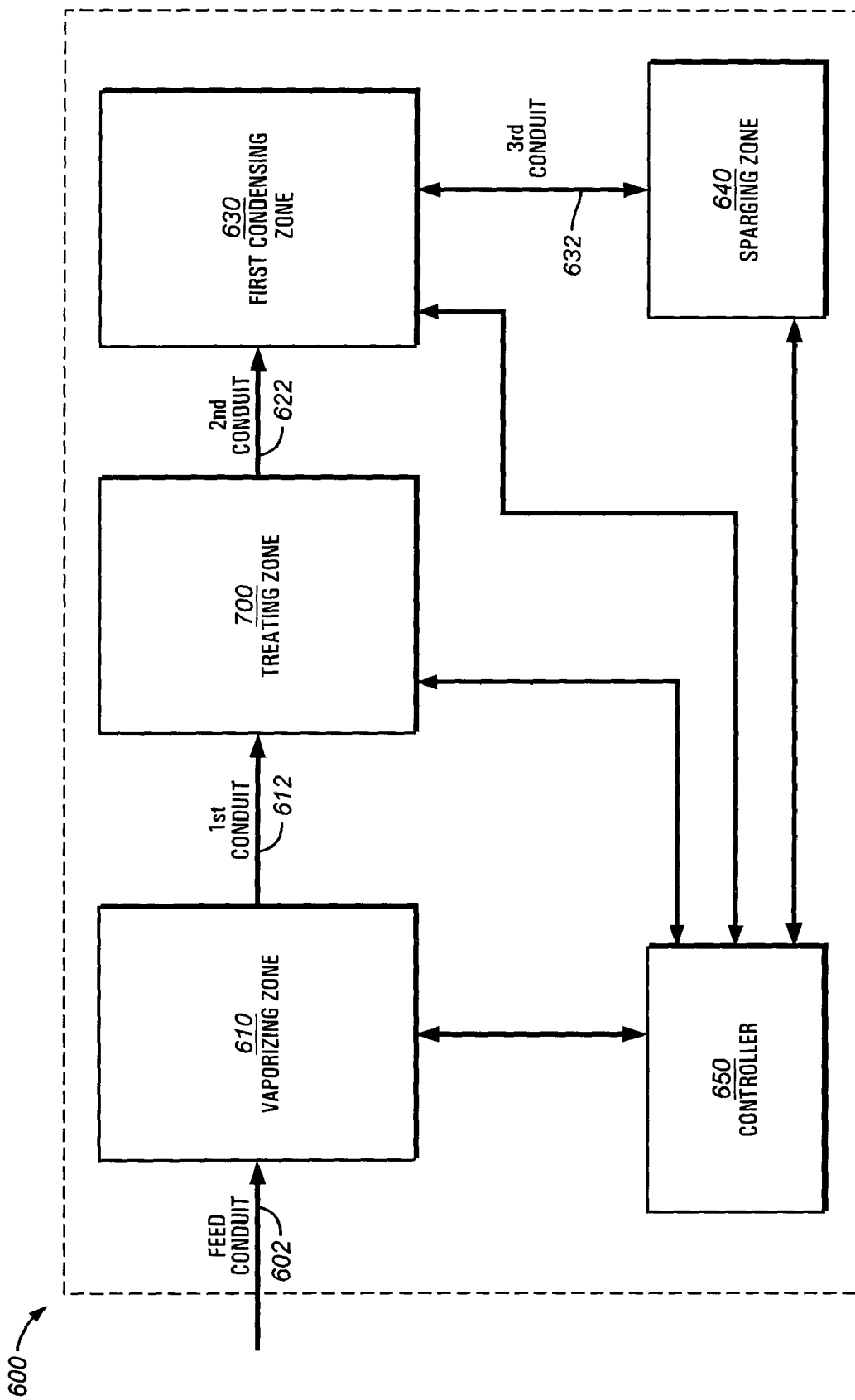
FIG. 6 shows a schematic representation of one embodiment of a system for gas purification.

One embodiment of the gas purification system is shown schematically as gas purification system 600 in FIG. 6. The system comprises a vaporizing zone 610, a treating zone 700, a first condensing zone 630, a sparging zone 640, and a controller 650, as well as a feed conduit 602, a first conduit 612, a second conduit 622, and a third conduit 632.

The feed conduit 602 is provided for passing a first liquid stream 102 to at least one inlet of a vaporizing zone 610. The singular term "conduit" does not preclude a plurality of pipes, lines, hoses, or other apparatus capable of passing a liquid being used to pass the first liquid stream to at least one inlet of the vaporizing zone 610. The pipes, lines, hoses, or other apparatus can be of any cross-sectional area and any length. The pipes, lines, hoses, or other apparatus (together, "the connections") have an inner wall, which defines the volume through which liquid is passed. The connections can comprise any material known in the art for its assembly. In one embodiment, the inner wall of the connections comprises PTFE, sintered metal, or ceramic. By "the inner wall comprises" is meant that the inner surface of the connections contains one or more layers, one or more coatings, or both which provide the portion of the inner surface in contact with the liquid passed through the conduit. In another embodiment, the inner wall comprises PTFE. Generally, PTFE can be coated over substantially the entire inner surface of the connections of the feed conduit 602.

The feed conduit 602 can also comprise insulation, a heating jacket, a cooling jacket, or one or more valves, among other possible components. In addition to the pipes, lines, hoses, or other apparatus, the feed conduit 602 can comprise pumps, valves, sensors, or other control devices, among other possible components.

The vaporizing zone 610 comprises at least one inlet and at least one outlet. It can comprise one or more vessels or tanks, as well as any pipes, lines, hoses, or other apparatus which can be present to provide liquid communication between a plurality of vessels or tanks, if a plurality of vessels or tanks are components of the vaporizing zone 610. The vessels or tanks can comprise any material known in the art for such applications. In one embodiment, the vessels or tanks comprise stainless steel. In addition, the vaporizing zone 610 can comprise any component useful in vaporizing a liquid, such as one or more heating jackets or one or more vapor pumps, among other components known in the art. Further, the vaporizing zone 610 can comprise sensors, valves, or other control devices. In one embodiment, data and commands can be passed bidirectionally between the sensors, valves, or other control devices of the vaporizing zone 610 and the controller 650.

The controller 650 may comprise one or more computers or other digital processors, one or more analog processors, or other components capable of reporting data from one or more of the vaporizing zone 610, the treating zone 700, the first condensing zone 630, or the sparging zone 640 and sending instructions to one or more of the vaporizing zone 610, the treating zone 700, the first condensing zone 630, or the sparging zone 640. In general, the controller 650 can receive data from and control the operation of the system 600.

In one embodiment, the vaporizing zone 610 can vaporize the first liquid stream 102 at a relatively low rate, e.g., can extract about 10–20% of the starting amount of the first liquid stream into the vapor phase per hour. In other embodiments, higher and lower vaporization rates can be possible.

The vaporizing zone 610 can extract a first vapor stream 112 from the first liquid stream 102. A first conduit 612 can then pass the first vapor stream 112 from at least one outlet of the vaporizing zone 610 to at least one inlet of a treating zone 700.

The first conduit 612 can comprise one or more pipes, lines, hoses, or other apparatus, and also can comprise pumps, valves, sensors, or other components. The first conduit 612 can comprise any materials described above in the context of the feed conduit 602.

The treating zone 700 comprises at least one inlet and at least one outlet. It can comprise one or more vessels or tanks, as well as any pipes, lines, hoses, or other apparatus which can be present to provide liquid communication between a plurality of vessels or tanks, if a plurality of vessels or tanks are components of the treating zone 700. The vessels or tanks can comprise any material known in the art for such applications. In one embodiment, the vessels or tanks comprise stainless steel.

Figure 7A:
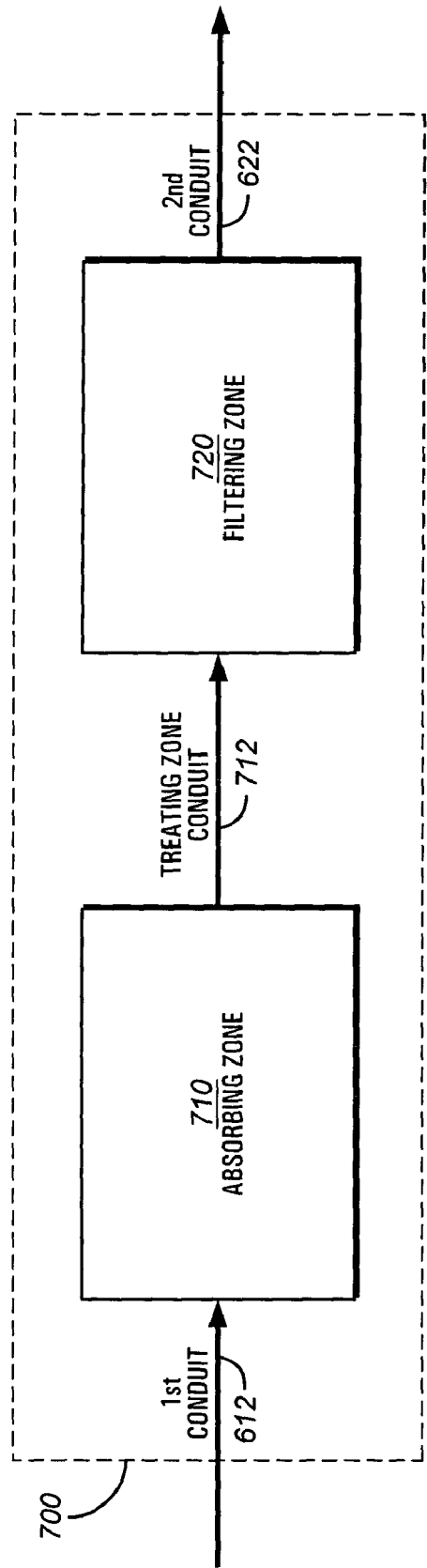
FIGS. 7A and 7B present schematic representations of two different embodiments of the treating zone of the embodiment of the system shown in FIG. 6.
Figure 7B:
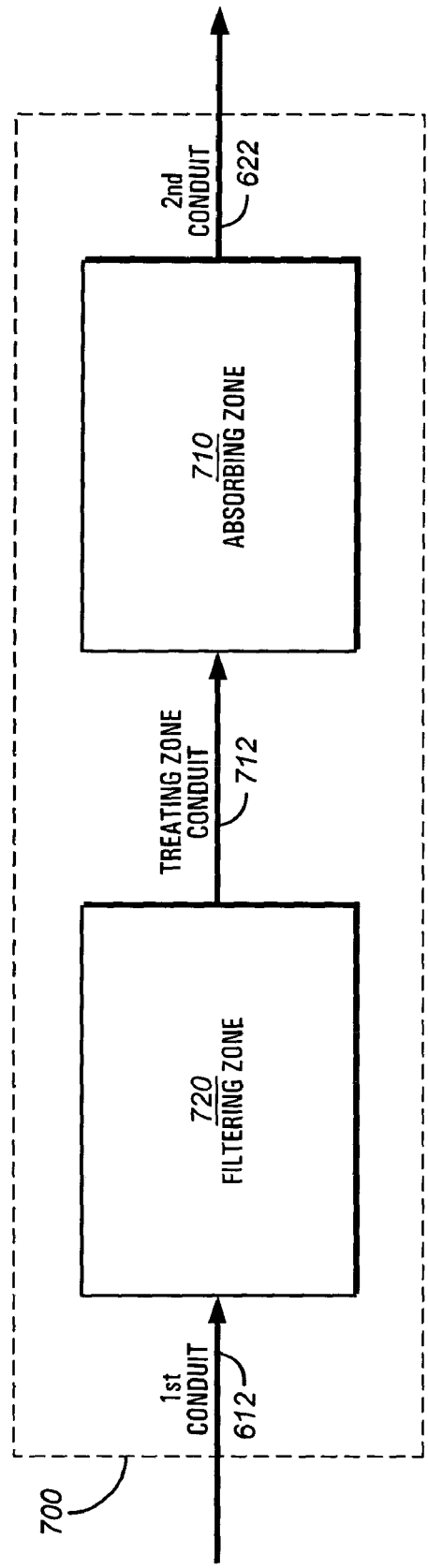

In one embodiment, the treating zone 700 can comprise an adsorbing zone, a filtering zone, or both. One embodiment of the treating zone 700 is represented in FIGS. 7A and 7B.

In this embodiment, the treating zone 700 comprises an adsorbing zone 710 and a filtering zone 720. The adsorbing zone 710 comprises one or more vessels or tanks, which may have any appropriate geometry and may be fabricated from any appropriate material, such as stainless steel, known to one of ordinary skill in the art, wherein at least one vessel or tank may contain an adsorbent able to remove water vapor from the first vapor stream. In one embodiment, the adsorbent can be a silica-alumina adsorbent. In another embodiment, the adsorbent can be an alumina adsorbent. In a further embodiment, the adsorbent can be an activated carbon adsorbent. In another embodiment, the adsorbent may be prepared for use according to a method described below.

The filtering zone 720 can comprise one or more filters which are able to remove particulates from the first vapor stream. The one or more filters can comprise one or more materials known to be useful in fabricating a filter. Exemplary materials include, but are not limited to, tetrafluoroethylene (PTFE; commercially available as Teflon®, DuPont, Wilmington, Del.), ceramics, and sintered metals, among others. In one embodiment, the one or more filters comprise PTFE.

The pore size of the one or more filters can be any size which is less than the diameter of at least a portion of the particles of the particulates. In one embodiment, the pore size of the one or more filters is about 0.5 microns. In another embodiment, the pore size of the one or more filters is about 0.03 microns. In one embodiment, wherein the filtering zone 720 comprises a plurality of filters, different of the filters can have different pore sizes.

As shown by FIGS. 7A and 7B, the adsorbing zone 710 and the filtering zone 720 can be oriented in either order. Upon adsorbing or filtering of the first vapor stream 112 by the more upstream of the adsorbing zone 710 and the filtering zone 720, the product of the adsorbing or filtering can be referred to as a treating zone vapor stream 212. The filtering zone 700 can comprise a treating zone conduit 712 for passing a treating zone vapor stream either (a) from at least one outlet of the adsorbing zone 710 to at least one inlet of the filtering zone 720 or (b) from at least one outlet of the filtering zone 720 to at least one inlet of the adsorbing zone 710.

Further, the treating zone 700 can comprise sensors, valves, or other control devices. In one embodiment, data and commands can be passed bidirectionally between the sensors, valves, or other control devices of the treating zone 700 and the controller 650. An example of this embodiment is shown in FIG. 6. Alternatively or in addition, the adsorbing zone 710, the filtering zone 720, or both can comprise sensors, valves, or other control devices. Though not shown, it will be apparent to the skilled artisan in light of this disclosure that in one embodiment, data and commands can be passed bidirectionally between the sensors, valves, or other control devices of the adsorbing zone 710 and the controller 650. Also not shown, but also apparent to the skilled artisan in light of this disclosure, in one embodiment, data and commands can be passed bidirectionally between the sensors, valves, or other control devices of the filtering zone 720 and the controller 650.

The product of the treating zone 700 is a second vapor stream 122.

Returning to FIG. 6, a second conduit 622 can pass the second vapor stream 122 from at least one outlet of the treating zone 700 to at least one inlet of a first condensing zone 630. The one or more pipes, lines, or hoses of the second conduit 622, as well as any valves, pumps, or other components of the second conduit 622, can be generally the same as those of the feed conduit 602 and the first conduit 612, described above.

The first condensing zone 630 comprises at least one inlet and at least one outlet. It can comprise one or more vessels or tanks, as well as any pipes, lines, hoses, or other apparatus which can be present to provide liquid communication between a plurality of vessels or tanks, if a plurality of vessels or tanks are components of the first condensing zone 630. The vessels or tanks can comprise any material known in the art for such applications. In one embodiment, the vessels or tanks comprise stainless steel. In addition, the first condensing zone 630 can comprise any component useful in condensing a vapor to a liquid, such as one or more cooling jackets, among other components known in the art. Further, the first condensing zone 630 can comprise sensors, valves, or other control devices. In one embodiment, data and commands can be passed bidirectionally between the sensors, valves, or other control devices of the first condensing zone 630 and a controller 650.

In one embodiment, the first condensing zone 630 can be held to a temperature between about 20° F. and about 40° F. greater than the freezing point of a gas to be purified by the system. If the gas is $Cl_2$, for example, the temperature can be held to between about −130° F. to about −110° F. In other embodiments, higher and lower temperatures for the first condensing zone 630 can be used.

The first condensing zone 630 can condense the second vapor stream 122 to a second liquid stream 132.

A third conduit 632 can pass the second liquid stream 132 from at least one outlet of the first condensing zone 630 to at least one inlet of a sparging zone 640. The third conduit 632 can comprise one or more pipes, lines, or hoses, as well as valves, pumps, or other components, which can be generally the same as those of the feed conduit 602 and the first conduit 612, described above.

The sparging zone 640 comprises at least one inlet, at least one vapor outlet, and at least one liquid outlet. It can comprise one or more vessels or tanks, as well as any pipes, lines, hoses, or other apparatus which can be present to provide liquid communication between a plurality of vessels or tanks, if a plurality of vessels or tanks are components of the sparging zone 640. The vessels or tanks can comprise any material known in the art for such applications. In one embodiment, the vessels or tanks comprise stainless steel. In addition, the sparging zone 640 can comprise any component useful in sparging an inert gas through a liquid, such as one or more gas feed lines, among other components known in the art. Further, the sparging zone 640 can comprise sensors, valves, or other control devices. In one embodiment, data and commands can be passed bidirectionally between the sensors, valves, or other control devices of the sparging zone 640 and the controller 650.

In one embodiment, the sparging zone 640 can be held to a temperature between about 70° F. and about 150° F., and to a pressure of the inert gas of from about 300 psig and about 700 psig. In other embodiments, higher and lower temperatures, pressures, or both for the sparging zone 640 can be used.

The sparging zone 640 can extract volatile impurities into the inert gas vapor phase 142 from the second liquid stream 132. The resulting liquid stream can be referred to as a third liquid stream 144. The third liquid stream 144 can be removed from the sparging zone 640 through the at least one liquid outlet for subsequent storage or other handling. The inert gas vapor phase 142 can be fed to the at least one vapor outlet of the sparging zone 640 for elimination from the system or further processing by additional components of the system.

Figure 8:
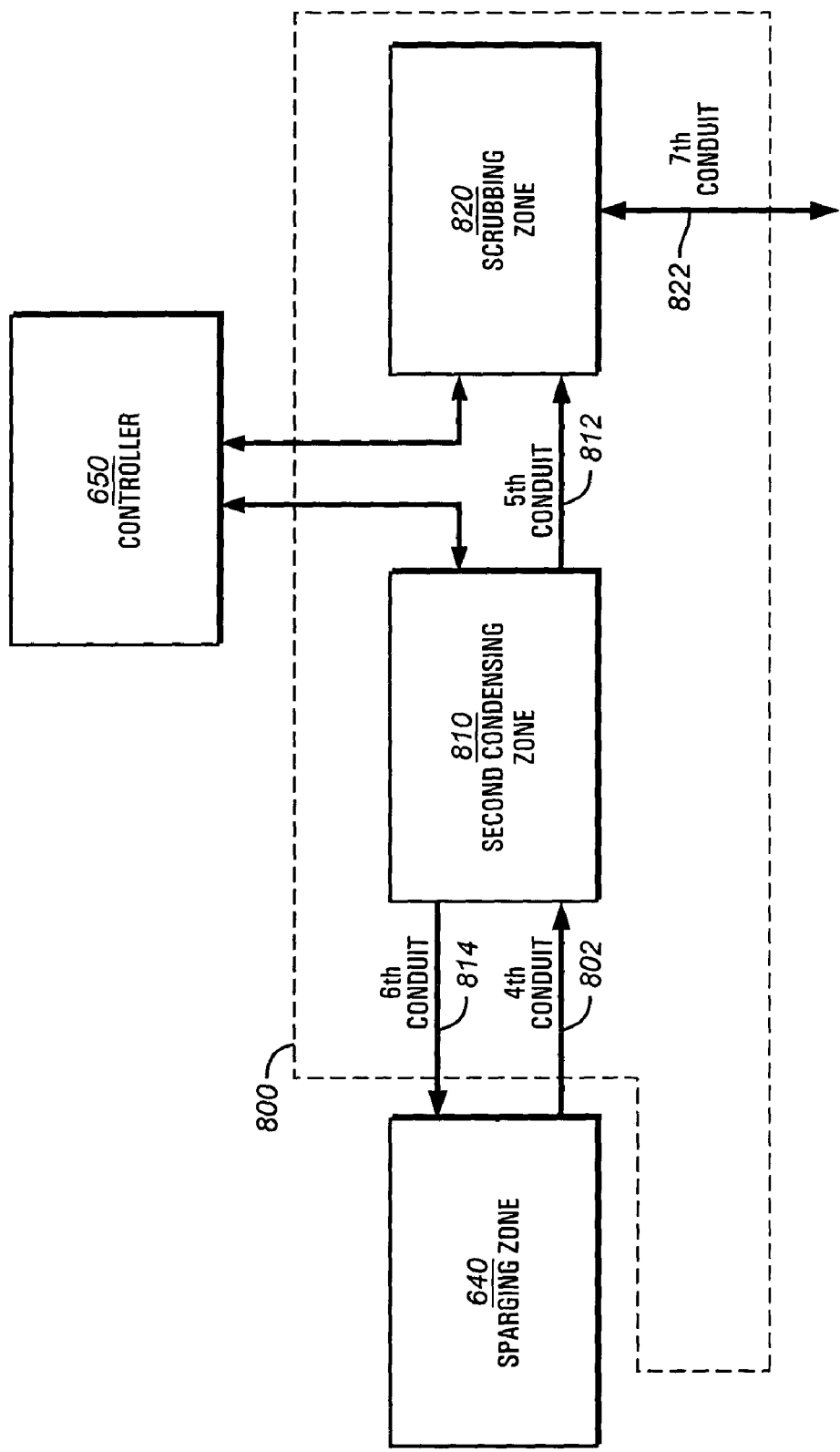
FIG. 8 shows a schematic representation of one embodiment of a scrubbing zone and a second condensing zone within an embodiment of a system for gas purification.

In one embodiment, the system further comprises additional components represented as element 800 in FIG. 8. Among the additional components is a fourth conduit 802 for passing the third vapor stream 142 from at least one vapor outlet of the sparging zone 640 to at least one inlet of a second condensing zone 810. The connections and components of the fourth conduit 802 are generally as described above.

The second condensing zone 810 comprises at least one inlet, at least one vapor outlet, and at least one liquid outlet. It can comprise one or more vessels or tanks, as well as any connections which can provide liquid communication between a plurality of vessels or tanks, if a plurality of vessels or tanks are components of the second condensing zone 810. The vessels or tanks can comprise any material known in the art for such applications. In one embodiment, the vessels or tanks comprise stainless steel. In addition, the second condensing zone 810 can comprise any component useful in condensing a vapor to a liquid, such as one or more cooling jackets, among other components known in the art. Further, the second condensing zone 810 can comprise sensors, valves, or other control devices. In one embodiment, data and commands can be passed bidirectionally between the sensors, valves, or other control devices of the second condensing zone 810 and the controller 650.

In one embodiment, the second condensing zone 810 can be held to a temperature between about 20° F. and about 40° F. greater than the freezing point of the gas to be purified by the system. If the gas is $Cl_2$, for example, the temperature can be held to between about −130° F. to about −110° F. In other embodiments, higher and lower temperatures for the second condensing zone 810 can be used. In one embodiment, the second condensing zone 810 is held at about 20° F. greater than the freezing point of the gas to be purified by the system.

The second condensing zone 810 can condense at least a first portion of the third vapor stream 142 to a fourth liquid stream 312. Typically, a second portion of the third vapor stream 142 can remain in the vapor phase after the first portion has been condensed, and this second portion can be referred to as a fourth vapor stream 314. The fourth vapor stream 314 can comprise a major portion of the inert gas present in the third vapor stream 142 and also can comprise one or more volatile impurities. The fourth vapor stream 314 is then passed to at least one vapor outlet of the second condensing zone 810.

A fifth conduit 812 can pass the fourth vapor stream 314 from at least one vapor outlet of the second condensing zone 810 to at least one inlet of a scrubbing zone 820. The connections and components of the fourth conduit 802 are generally as described above.

The scrubbing zone 820 comprises at least one inlet and at least one outlet. It can comprise one or more vessels or tanks, as well as any connections which can provide liquid communication between a plurality of vessels or tanks, if a plurality of vessels or tanks are components of the scrubbing zone 820. The vessels or tanks can comprise any material known in the art for such applications. In one embodiment, the vessels or tanks comprise stainless steel. In addition, the scrubbing zone 820 can comprise any component useful in removing a major portion of the gas being purified from the system present in the fourth vapor stream. Further, the scrubbing zone 820 can comprise sensors, valves, or other control devices. In one embodiment, data and commands can be passed bidirectionally between the sensors, valves, or other control devices of the scrubbing zone 820 and the controller 650.

Any suitable temperature, pressure, and other parameters for the scrubbing zone 820 can be used.

The scrubbing zone 820 can remove a major portion of the gas to be purified by the system 600 from the fourth vapor stream 314, resulting in what can be referred to as a fifth vapor stream 322. The fifth vapor stream 322 can comprise a major portion of the inert gas and also can comprise one or more volatile impurities. The fifth vapor stream 322 can be passed to at least one outlet of the scrubbing zone 820.

From the at least one outlet of the scrubbing zone 820, a seventh conduit 822 can pass the fifth vapor stream to elimination from the system. The connections and components of the seventh conduit 822 are generally as described above.

The third liquid stream 312 prepared in the second condensing zone 810 can be passed from at least one outlet of the second condensing zone 810 by a sixth conduit 814 to at least one inlet of the sparging zone 640. The connections and components of the sixth conduit 814 are generally as described above.

In one embodiment, the present invention relates to a method of treating an adsorbent, comprising:
 first heating the adsorbent at a first temperature under dry nitrogen; and
 second heating the adsorbent at a second temperature, wherein the second temperature is less than the first temperature and greater than 100° C., under a gas comprising $Cl_2$, $Br_2$, $F_2$, HCl, HF, or HBr.

The adsorbent is an adsorbent capable of removing water vapor from a vapor stream. In one embodiment, the adsorbent is a silica-alumina adsorbent. Exemplary commercially available silica-alumina adsorbents include the model names AW-300 and AW-500 (UOP LLC, Des Plaines, Ill.), among others. In another embodiment, the adsorbent can be an alumina adsorbent. In a further embodiment, the adsorbent can be an activated carbon adsorbent. Generally, without performance of the method, such adsorbents are not conducive to removing water vapor from a vapor stream comprising a corrosive gas, such as $Cl_2$, $Br_2$, $F_2$, HCl, HF, or HBr, as a result of reactions between the corrosive gas and water present in the adsorbent. Though not to be bound by theory, the present method appears to remove substantially all water from the adsorbent and so minimizes reactions involving the corrosive gas.

The adsorbent can be loaded into any appropriate vessel, such as a vessel fabricated from stainless steel, known to one of ordinary skill in the art. The vessel can have at least one inlet and at least one outlet. In addition to preparing a fresh adsorbent by performing the method, an adsorbent that has undergone use according to the above method and system for gas purification can be regenerated by performing the method. Regeneration can be appropriate if the water vapor concentration of the output from the adsorbent into downstream steps of the method or downstream components of the system is greater than a desired tolerance. In one embodiment, the desired tolerance is about 5 ppm.

Figure 4:
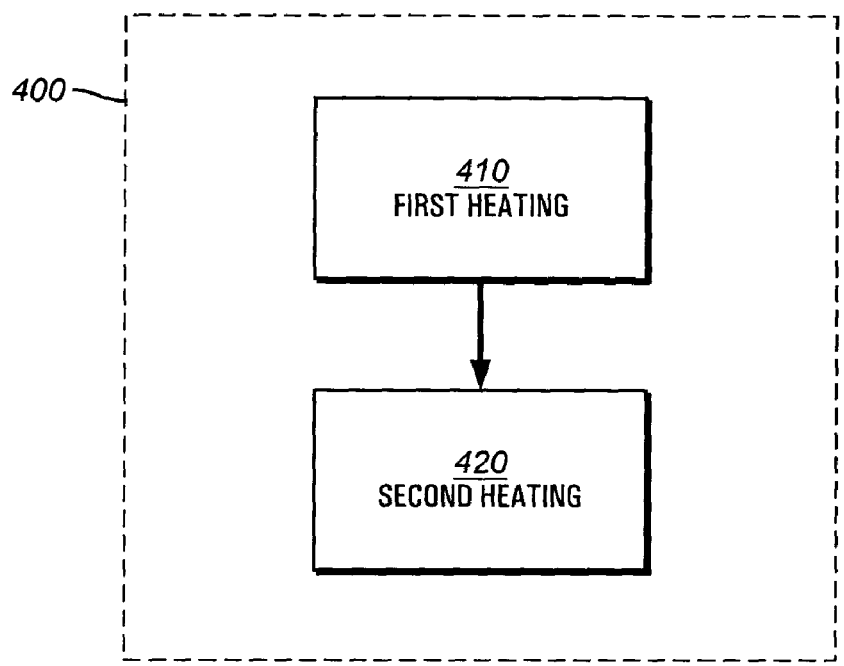
FIG. 4 presents a flow chart of one embodiment of the method of treating an adsorbent.

In one embodiment, the method in association with the present invention is represented in FIG. 4.

The method 400 comprises a first heating step 410. In the first heating step 410, the adsorbent is heated at a first temperature under dry nitrogen. By "under dry nitrogen" is meant that nitrogen which is substantially free of water, i.e., comprises less than 5 ppm water, is flowed through the adsorbent while the first heating step 410 is performed.

The first temperature can be any temperature effective in preparing an adsorbent to remove water vapor from a corrosive gas. The duration of the first heating step 410 is not critical. The flow rate of the dry nitrogen is also not critical.

In one embodiment, the first temperature is from about 150° C. to about 350° C. In another embodiment, the first temperature is from about 300° C. to about 350° C., and the first heating step 410 is performed for about 12 hr to about 72 hr.

The method 400 comprises a second heating step 420. In the second heating step 420, the adsorbent is heated at a second temperature that is less than the first temperature and greater than 100° C., under a gas comprising $Cl_2$, $Br_2$, $F_2$, HCl, HF, or HBr. "Under the gas" means the gas is flowed through the adsorbent while the second heating step 420 is performed.

The second temperature can be any temperature effective in preparing an adsorbent to remove water vapor from a corrosive gas, provided it is less than the first temperature and greater than 100° C. The duration of the second heating step 420 may vary. The flow rate of the gas also may vary. In one embodiment, the gas can be the same gas for which removal of water vapor is desired by use of the adsorbent prepared according to this method. In another embodiment, the gas can differ from the gas for which removal of water vapor is desired by use of the adsorbent prepared according to this method.

In one embodiment, the second temperature is from about 150° C. to about 250° C. In another embodiment, the second temperature is from about 175° C. to about 225° C., and the second heating step 420 is performed for about 6 hr to about 48 hr.

In one embodiment, the gas comprises $Cl_2$.

Generally, during the course of the first heating step 410 and the second heating step 420, $CO_2$ and water vapor are carried out of the adsorbent by the dry nitrogen, the gas comprising $Cl_2$, $Br_2$, $F_2$, HCl, HF, or HBr, or both. In one embodiment, the first heating step 410 and the second heating step 420 can be performed one time each.

Figure 5:
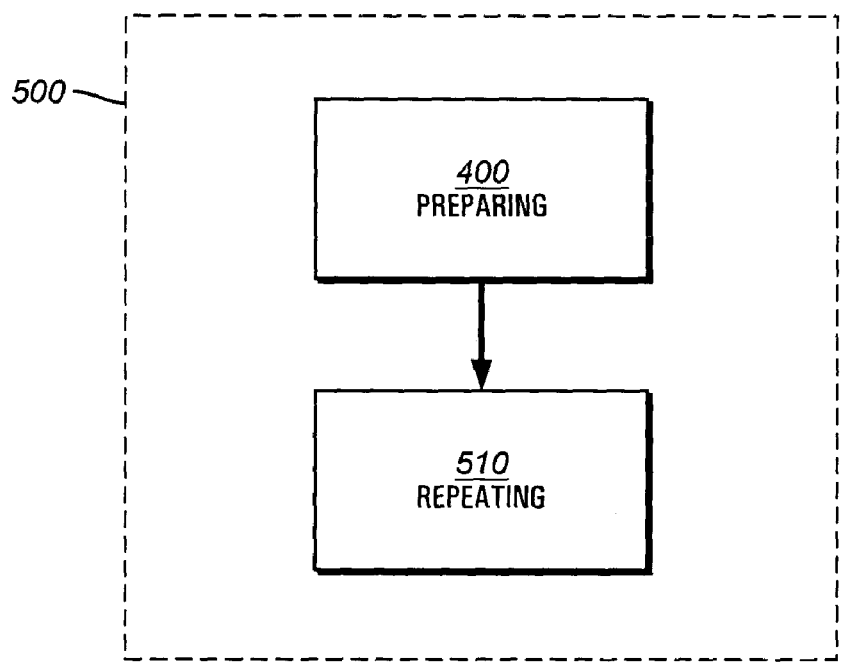
FIG. 5 presents a flow chart of another embodiment of the method of treating an adsorbent.

Turning to FIG. 5, a method, which includes the method 400 and a repeating step 510, is illustrated. The repeating step 510 provides for repeating the first heating step 410 and the second heating step 420 until $CO_2$ and water vapor are substantially not detectable in the nitrogen or the gas comprising $Cl_2$, $Br_2$, $F_2$, HCl, HF, or HBr. By "substantially not detectable" means that the concentrations of both $CO_2$ and water vapor in both the nitrogen and the gas comprising $Cl_2$, $Br_2$, $F_2$, HCl, HF, or HBr are each less than about 1 ppm.

Various embodiments for the repeating step 510 include those described in reference to the first heating step 410 and the second heating step 420, above.

In another embodiment, the present invention relates to an adsorbent, prepared by a method comprising:
 first heating the adsorbent at a first temperature under dry nitrogen; and
 second heating the adsorbent at a second temperature, wherein the second temperature is less than the first temperature and greater than 100° C., under a gas comprising $Cl_2$, $Br_2$, $F_2$, HCl, HF, or HBr.

The adsorbent is an adsorbent capable of removing water vapor from a vapor stream. In one embodiment, the adsorbent is a silica-alumina adsorbent. Exemplary commercially available silica-alumina adsorbents include the model names AW-300 and AW-500 (UOP LLC, Des Plaines, Ill.), among others. In another embodiment, the adsorbent can be an alumina adsorbent. In a further embodiment, the adsorbent can be an activated carbon adsorbent. Generally, without performance of the method, such adsorbents are not conducive to removing water vapor from a vapor stream comprising a corrosive gas, such as $Cl_2$, $Br_2$, $F_2$, HCl, HF, or HBr, as a result of reactions between the corrosive gas and water present in the adsorbent. Though not to be bound by theory, the present method appears to remove substantially all water from the adsorbent and so minimizes reactions involving the corrosive gas.

The adsorbent can be loaded into any appropriate vessel, such as a vessel fabricated from stainless steel, known to one of ordinary skill in the art. The vessel can have at least one inlet and at least one outlet. In addition to preparing a fresh adsorbent by performing the method, an adsorbent that has undergone use according to the above method and system for gas purification can be regenerated by performing the method. Regeneration can be appropriate if the water vapor concentration of the output from the adsorbent into downstream steps of the method or downstream components of the system is greater than a desired tolerance. In one embodiment, the desired tolerance is about 5 ppm.

The method has been described above.

The following examples are included to demonstrate preferred embodiments of the invention. It should be appreciated by those of skill in the art that the techniques disclosed in the examples which follow represent techniques discovered by the inventors to function well in the practice of the invention. However, those of skill in the art should, in light of the present disclosure, appreciate that many changes can be made in the specific embodiments which are disclosed and still obtain a like or similar result without departing from the spirit and scope of the invention.

EXAMPLE 1

Ultra Pure Chlorine Purification in a Pilot Plant

The following example demonstrates that the method and system described above is effective in producing an ultra pure $Cl_2$ product in a pilot plant.

Loading crude chlorine into the purification system from the vapor phase can reduce the concentrations of metals that are present in the crude chlorine liquid. A vapor phase withdrawal rate of about 60 lbs/hr to about 80 lbs/hr (controlled by the first condensation temperature) can lead to vapor phase withdrawal with very little small liquid drop formation and a metal concentration in the range of about 1 ppb–10 ppb.

Thereafter, the vapor phase was contacted with a commercial silica-alumina-based molecular sieve. In the pilot plant, either AW-300 or AW-500 (UOP LLC, Des Plaines, Ill.) was used after being prepared according to the method described above. After three years of operation in a pilot plant, with periodic regenerating as appropriate, the prepared adsorbent remains able to lower the content of water vapor to about 1 ppm.

It should also be noted that mechanical devices are not used in the pilot plant for transferring chlorine vapor or chlorine liquid from one operating unit (or zone) to another or for downloading the final product from the system into a storage container. Therefore, potential contamination of the final product by erosion of metals from mechanical devices was eliminated, and also, the lack of moving mechanical devices in the system allowed greater dependability and reliability.

Also, it should be noted that the pilot plant is able to run vapor condensation and liquid stripping separately or simultaneously. Operating units (zones) are connected sequentially and impurities can be removed continuously. The only breaking down that has been needed is changing in filled crude containers and empty product containers for empty crude containers and filled product containers. The amount of product lost has been negligible, in part a result of the second condensation being performed close to the chlorine freezing temperature, at which temperature chlorine has a very low partial pressure and thus a very major portion of the chlorine enters and remains in the liquid phase as the stripping gas effluent and impurities carried thereon are discharged into an air emission control unit.

In addition, the setup of product recovery from returned containers, and the cleaning of returned containers prior to refilling, can be integrated into the system to ensure high consistency and high quality of the product.

In the pilot plant, chlorine vapor was withdrawn from a crude chlorine storage tank containing a liquid comprising no more than about 99.0% $Cl_2$. The chlorine vapor withdrawal rate was between about 60 lbs/hr and about 80 lbs/hr. This relatively low withdrawal rate led to very low metal content in the vapor; in a portion of the runs, the metal content of the vapor was about 1 ppb. Vapor withdrawal was accomplished by opening valves as far downstream as, but not beyond, the first condenser (i.e., the first condenser was in vapor communication with the storage tank).

The chlorine vapor stream was then fed to an adsorber comprising a silica-alumina adsorbent (AW-300, UOP LLC, Des Plaines, Ill.) prepared and periodically reconditioned according to the following method.

The adsorbent was packed in an adsorbent vessel (herein, "adsorber"). The packed adsorbent can be referred to as an "adsorbent bed" or simply "bed." The adsorber was made of 6 inch, schedule 80, 316 L stainless steel pipe with a 1 inch open neck at the top sealed by flanges. The adsorber was taken off-line for the preparation or reconditioning steps. First, the adsorbent was gradually heated to about 350° C. under ultra dry nitrogen for about 48 hr. At least a portion of the water vapor present in the adsorbent was removed. Second, the bed temperature was reduced to between about 150° C. and about 250° C., and the nitrogen flow was stopped. Pure chlorine vapor at between about 20 psig and about 50 psig was then passed through the adsorbent to clean out solid residues, such as metal oxides or carbonates. Chlorine vapor flow was then stopped, dry nitrogen flow was resumed, and the bed temperature was returned to about 350° C. for about 24 hr. The cycle was repeated until the concentrations of $CO_2$ and water vapor emitted by the adsorbent bed were not detectable. Thereafter, the prepared adsorber was ready for use in moisture removal.

The prepared adsorber reduced the water vapor content of the chlorine vapor stream to a low level; in a portion of the runs, the water vapor content of the chlorine vapor stream after treatment by the prepared adsorber was reduced to less than about 1 ppm.

After passing through the prepared adsorber, the chlorine vapor stream was filtered by passing through a filter capable of filtering out particles with a size greater than about 0.03 microns.

After filtration, the chlorine vapor stream was condensed into liquid and the liquid accumulated in a first condenser. The operating temperature of the first condenser was held between about 20° F. and about 40° F. above the freezing point of liquid chlorine.

The condensers used in the pilot plant comprised an inner vessel (ASME code: U) was made of 6 inch, schedule 80, 316 L stainless steel pipe. The inner vessel could hold roughly 225 lb of liquid chlorine. The inner vessel had a liquid side, identified by a dip tube located at the center of the vessel, and a vapor side, identified by another tube of the vessel. The inner vessel was wrapped in a cooling coil made of a ½ inch, 316 L stainless steel pipe. The inner vessel and the cooling coil were immersed in a vacuum jacketed dewar filled with isopropyl alcohol. The dewar was sealed by top flanges capable of supporting the total weight of the vessel, liquid chlorine, alcohol, and cooling coil. Liquid nitrogen was fed through the cooling coil to maintain the isopropyl alcohol bath at the desired temperature. Scales were used to monitor the weight changes resulting from passage and accumulation of chlorine in each condenser, as well as in other devices within the system.

Chlorine vapor was withdrawn from the storage tank until the holding capacity of the first condenser was reached. Although the first condenser could be readily scaled up or down to possess a holding capacity ranging from about 100 lbs to several thousand pounds, in the pilot plant the first condenser had a holding capacity of about 225 lbs liquid chlorine.

When the amount of liquid chlorine in the first condenser approximately reached the holding capacity, a valve between the filter and the first condenser was closed to arrest the withdrawal of vapor from the storage tank. Thereafter, a valve between a helium source and the headspace of the first condenser, as well as a valve between the liquid-holding area of the first condenser and the sparger, were opened. The helium forced the liquid chlorine from the first condenser to the sparger. The sparger had a holding capacity of about 225 lbs liquid chlorine. After transfer of the liquid chlorine to the sparger, the valve between the helium source and the headspace of the first condenser and the valve between the liquid-holding area of the first condenser and the sparger were closed, and the valve between the filter and the first condenser was opened, to resume vapor withdrawal from the storage tank.

The sparger used in the pilot plant comprised an inner vessel (ASME code: U) of 6 inch, schedule 80, 316 L stainless steel pipe. The inner vessel could hold roughly 225 lb of liquid chlorine. The inner vessel had a liquid side, identified by a dip tube located at the center of the vessel, and a vapor side, identified by another tube of the vessel. The sparger also included two electrical heaters located near the bottom of the inner vessel. The inner vessel and the electrical heaters were immersed in a vacuum jacketed dewar filled with water. Scales were used to monitor the weight changes resulting from passage and accumulation of chlorine in the sparger.

The sparging process commenced by opening a valve between the helium source and the sparger, which led to bubbling of helium through the liquid. The temperature of the liquid was maintained between about 70° F. and about 150° F. The helium sparging pressure was maintained between about 300 psig and about 700 psig. The helium stream exiting the sparger contained chlorine vapor and impurities such as $N_2$, $O_2$, CO, and $CO_2$.

After leaving the sparger, the helium stream was then directed to a second condenser. The second condenser was similar to the first. The second condenser was held at 20° F. greater than the freezing point of liquid chlorine. In the second condenser, the chlorine vapor component of the helium stream was recondensed into liquid and retained in the second condenser. The helium and impurities in the helium stream (which included, at a portion of the times, trace chlorine) was routed to a wet scrubber for removal of trace chlorine and the remaining helium and impurities were then discharged to ambient air. After condensing, the liquid chlorine was passed, by opening and closing appropriate valves, from the second condenser to the sparger. Typically, the liquid chlorine was recycled from the second condenser to the sparger after product was removed from the sparger to a collecting tank.

During sparging, the contents of impurities such as $N_2$, $O_2$, CO, and $CO_2$ in the chlorine liquid were reduced. The extent to which the impurities contents were reduced was measured by online instruments, which in a portion of the runs included a gas chromatograph and an FTIR instrument. When the measured concentrations of impurities were lowered to designated specifications, the valves between the sparger and the first condenser and between the sparger and the second condenser were closed. The valve between the sparger and the helium source was often closed, but could be opened to force liquid chlorine from the sparger. A valve between the sparger and a collecting tank was opened, and the liquid chlorine was fed to the collecting tank. As stated above, helium could be used to force ultra pure liquid chlorine to the collecting tank.

The holding capacity of the collecting tank could be readily scaled up or down. In the pilot plant, the collecting tank had a holding capacity of about 1500 lb.

In the pilot plant, ultra pure chlorine was transferred from the collecting tank to product containers, such as cylinders, by closing the valve between the sparger and the collecting tank and opening a valve between the helium source and the head space of the collecting tank. Pressurized helium then forced the ultra pure chlorine to a product filling station, where one or more cylinders were connected in parallel and filled one by one. A scale monitored the weight of chlorine filled in each cylinder.

As emptied product containers were returned to the pilot plant after use, a portion of the chlorine remained in the containers, and thus the containers required cleaning prior to refilling. Two approaches were tested in the pilot plant for feeding residual chlorine into the system for purification. In one approach, the residual chlorine in the containers was fed into the gas purification system downstream of the crude tank and upstream of the adsorber. In the other approach, helium was forced into the container and the residual chlorine was shunted by helium pressure into the crude tank. The container was then depressurized and cleaned by vacuum prior to reuse.

All of the methods and apparatus disclosed and claimed herein can be made and executed without undue experimentation in light of the present disclosure. While the methods of this invention have been described in terms of particular embodiments, it will be apparent to those of skill in the art that modifications may be applied to the methods and apparatus and in the steps or in the sequence of steps of the methods described herein without departing from the concept, spirit and scope of the invention. All such modifications apparent to those skilled in the art are deemed to be within the spirit, scope and concept of the invention as defined by the appended claims.

What is claimed is:

1. A method for preparing a highly purified gas from a crude liquid comprising the gas and one or more of a metal, particulates, water vapor, or a volatile impurity, comprising:
    vaporizing the crude liquid, to yield (i) a first vapor stream comprising the gas and (ii) a first liquid stream comprising the gas;
    removing water vapor, particulates, or both from the first vapor stream, to yield a second vapor stream comprising the gas;
    condensing the second vapor stream, to yield a second liquid stream comprising the gas; and
    sparging the second liquid stream with an inert gas, to yield (i) a third vapor stream comprising the gas and (ii) a third liquid stream comprising the highly purified gas.

2. The method of claim 1, wherein the gas comprises $Cl_2$, $Br_2$, $F_2$, HCl, HF, or HBr.

3. The method of claim 2, wherein the gas comprises $Cl_2$.

4. The method of claim 1, wherein the removing step comprises (a) contacting the first vapor stream with an adsorbent, to remove water vapor and (b) filtering the first vapor stream, to remove particulates.

5. The method of claim 4, wherein the adsorbent is prepared by:
    first heating at a first temperature under dry nitrogen; and
    second heating at a second temperature, wherein the second temperature is less than the first temperature and greater than 100° C., under a gas comprising $Cl_2$, $Br_2$, $F_2$, HCl, HF, or HBr.

6. The method of claim 1, wherein the inert gas comprises helium, neon, argon, krypton, xenon, nitrogen, or mixtures thereof.

7. The method of claim 6, wherein the inert gas comprises helium, neon, argon, krypton, xenon, or mixtures thereof.

8. The method of claim 7, wherein the inert gas comprises helium.

9. The method of claim 6, wherein the inert gas is nitrogen for a beginning portion of the sparging step and is helium for an ending portion of the sparging step.

10. The method of claim 1, further comprising:
condensing the third vapor stream, to yield (i) a fourth vapor stream comprising the inert gas and (ii) a fourth liquid stream comprising the gas;
scrubbing the fourth vapor stream, to yield a fifth vapor stream; and
recycling the fourth liquid stream to the sparging step.

11. A gas purification system, comprising:
a feed conduit for passing a first liquid stream to at least one inlet of a vaporizing zone;
the vaporizing zone, wherein the vaporizing zone comprises at least one inlet and at least one outlet;
a first conduit for passing a first vapor stream from at least one outlet of the vaporizing zone to at least one inlet of a treating zone;
the treating zone, wherein the treating zone comprises at least one inlet and at least one outlet;
a second conduit for passing a second vapor stream from at least one outlet of the treating zone to at least one inlet of a first condensing zone;
the first condensing zone, wherein the first condensing zone comprises at least one inlet and at least one outlet;
a third conduit for passing a second liquid stream from at least one outlet of the first condensing zone to at least one inlet of a sparging zone; and
the sparging zone, wherein the sparging zone comprises at least one inlet, at least one vapor outlet, and at least one liquid outlet.

12. The gas purification system of claim 11, wherein the treating zone comprises:
an adsorbing zone having at least one inlet and at least one outlet;
a filtering zone having at least one inlet and at least one outlet; and
a treating zone conduit for passing a treating zone vapor stream either (a) from at least one outlet of the adsorbing zone to at least one inlet of the filtering zone or (b) from at least one outlet of the filtering zone to at least one inlet of the adsorbing zone.

13. The gas purification system of claim 11, further comprising:
a fourth conduit for passing a third vapor stream from at least one vapor outlet of the sparging zone to at least one inlet of a second condensing zone;
the second condensing zone, wherein the second condensing zone comprises at least one inlet, at least one vapor outlet, and at least one liquid outlet;
a fifth conduit for passing a fourth vapor stream from at least one vapor outlet of the second condensing zone to at least one inlet of a scrubbing zone;
the scrubbing zone, wherein the scrubbing zone comprises at least one inlet and at least one outlet;
a sixth conduit for passing a third liquid stream from at least one outlet of the second condensing zone to at least one inlet of the sparging zone; and
a seventh conduit for passing a fifth vapor stream from at least one outlet of the scrubbing zone to elimination from the system.

* * * * *